United States Patent
Yoo et al.

(10) Patent No.: US 11,430,314 B2
(45) Date of Patent: Aug. 30, 2022

(54) LOW-POWER WIRE ROPE SAFETY DIAGNOSIS METHOD AND SYSTEM

(71) Applicant: Nkia Co., Ltd., Seongnam-si (KR)

(72) Inventors: Sung Soo Yoo, Anyang-si (KR); In Hwan Lee, Seongnam-si (KR); Ki Hoon Shin, Anyang-si (KR); Eun Min Yoo, Yongin-si (KR); Junghwan Son, Seoul (KR)

(73) Assignee: NKIA CO., LTD., Seongnam-si (KR)

( * ) Notice: Subject to any disclaimer, the term of this patent is extended or adjusted under 35 U.S.C. 154(b) by 20 days.

(21) Appl. No.: 17/097,315

(22) Filed: Nov. 13, 2020

(65) Prior Publication Data
US 2022/0058931 A1 Feb. 24, 2022

(30) Foreign Application Priority Data
Aug. 19, 2020 (KR) .......................... 10-2020-0103903

(51) Int. Cl.
*G08B 21/02* (2006.01)
*B66D 1/54* (2006.01)
*G06N 3/08* (2006.01)

(52) U.S. Cl.
CPC ............... *G08B 21/02* (2013.01); *B66D 1/54* (2013.01); *G06N 3/08* (2013.01)

(58) Field of Classification Search
CPC ............. G08B 21/02; B66D 1/54; G06N 3/08
See application file for complete search history.

(56) References Cited

U.S. PATENT DOCUMENTS

2016/0282311 A1* 9/2016 Hirokawa ............... G01N 29/14
2017/0045493 A1* 2/2017 van der Woude .... B66B 7/1215

FOREIGN PATENT DOCUMENTS

| CN | 110550526 | 12/2019 |
| EP | 3130555 | 2/2017 |
| EP | 3647249 | 5/2020 |
| KR | 20080096708 | 10/2008 |
| KR | 101666678 | 10/2016 |

OTHER PUBLICATIONS

European Search Report—European Application No. 20207439.9 dated May 14, 2021, citing EP3130555, CN110550526, and EP3647249.
Korean Office Action—Korean Application No. 10-2020-0103903 dated Feb. 3, 2022, citing KR 10-2008-0096708 and KR 10-1666678.

* cited by examiner

*Primary Examiner* — Mohamed Barakat
*Assistant Examiner* — Rufus C Point
(74) *Attorney, Agent, or Firm* — Cantor Colburn LLP

(57) ABSTRACT

A low-power wire rope safety diagnosis method and a system thereof are provided. Since a sensor should be continuously turned on to allow a plurality of sensor nodes to diagnose safety of a wire rope in real time and it consumes much power, there is provided a method and system which can perform the safety diagnosis only when a movement is detected while being in a standby mode to reduce the power consumption, and determine a defect more correctly and consistently by utilizing deep learning when defects are determined through a wire rope safety diagnosis.

15 Claims, 5 Drawing Sheets

LOW-POWER WIRE ROPE SAFETY DIAGNOSIS METHOD AND SYSTEM

BACKGROUND OF THE INVENTION

Field of the Invention

The present invention relates to a low-power wire rope safety diagnosis method and a system thereof, and more specifically, to a method and system that may operate with low power in diagnosing safety of a wire rope used in a hoisting device or the like capable of lifting an object, by way of switching a sensor to a standby mode in a time period other than a predetermined time period, and performing a safety diagnosis only when movement of a wire is detected while not being in the standby mode.

Background of the Related Art

As manual inspection through dimension or visual inspection or expensive one-time manual inspection using expensive large-scale foreign inspection equipment is carried out to prevent wire rope industrial disasters in existing industrial sites, risks such as management risks or excessive cost by manual management may occur.

Thereafter, cost reduction and highly accurate inspection can be performed to minimize such risks through a wire rope safety diagnosis using a sensor.

However, a device for safety diagnosis of a wire rope requires a plurality of sensor nodes, and there is a difficulty of consuming much power when these sensors operate in real-time, and to solve this problem, the need of a wire rope safety diagnosis sensing technique operated with low power is emerged.

SUMMARY OF THE INVENTION

Accordingly, the present invention has been made in view of the above-mentioned problems occurring in the prior art, and an object of the present invention is to improve efficiency in diagnosing safety of a wire rope by saving power in a way of switching a sensor to a standby mode in a time period other than a predetermined time period and sensing motion only when needed to perform a safety diagnosis only when a movement is detected, and as deep learning is used in the safety diagnosis, it is possible to diagnose defects more consistently and correctly.

The problems of the present invention are not limited to those mentioned above, and unmentioned other problems will be clearly understood by those skilled in the art from the following description.

To accomplish the above object, according to an aspect of the present invention, there is provided a low-power wire rope safety diagnosis method comprising the steps of: (a) waking up from a standby mode and transmitting a control request signal to an AP, which is an access point of a software platform for diagnosing low-power wire rope safety, by a sensor unit; (b) determining whether motion detection is needed, and transmitting a motion detection signal to the sensor unit when it is determined that motion detection is needed, by the AP receiving the control request signal from the sensor unit; (c) detecting motion through a motion detection sensor, and performing wire rope safety diagnosis sensing through a safety diagnosis sensor when a motion is detected, by the sensor unit receiving the motion detection signal from the AP; (d) determining a defect of a wire rope using deep learning through an artificial intelligence server when the sensor unit terminates the safety diagnosis sensing, by the platform; and (e) repeating steps (b) to (d).

At step (a), the sensor unit wakes up from the standby mode when a preset time is elapsed after the sensor unit enters the standby mode.

At step (b), the AP determines whether sensing has been performed today, whether today corresponds to an operating date and an operating day, and whether a current time is business hours, and transmits a motion detection signal to the sensor unit only when it is determined that motion detection is needed.

At step (b), the AP determines whether sensing has been performed today, whether today corresponds to an operating date and an operating day, and whether a current time is business hours, and transmits a standby signal to the sensor unit only when it is not determined that motion detection is needed, and the sensor unit enters the standby mode for a preset time.

At step (c), the motion detection sensor is one of a plurality of sensor nodes included in the safety diagnosis sensor, which measures magnetic force of an object, compares a voltage measured before a predetermined time with a currently measured voltage, and determines that a motion is detected when a voltage difference exceeds a threshold voltage value.

At step (c), the motion detection sensor is a gyro sensor connected to be separate from the safety diagnosis sensor to detect vertical movement, which compares a coordinate value of an object measured before a predetermined time with a currently measured coordinate value, and determines that a motion is detected when a z-axis change exceeds a threshold change.

At step (d), the sensor unit stores sensor data generated by performing the safety diagnosis sensing in a database, and transmits the stored sensor data and the control request signal to the AP when the safety diagnosis sensing is terminated, and when the platform receiving the sensor data from the AP requests the artificial intelligence server to perform signal processing and defect determination on the sensor data, the artificial intelligence server determines a defect of the wire rope through deep learning.

Step (d) includes the steps of: storing the sensor data generated by performing the safety diagnosis sensing in the database, terminating the safety diagnosis sensing after a predetermined time is elapsed, and transmitting the stored sensor data and the control request signal to the AP, by the sensor unit; performing, when the platform requests the artificial intelligence server to perform signal processing on the sensor data, a first determination step of performing preprocessing of removing noise and trend of the sensor data, and determining that there is a defect when leakage magnetic flux exceeding a predetermined value occurs, by the artificial intelligence server; and performing a second determination step of extracting various statistical features from the preprocessed data, and determining that there is a defect through deep learning of a feed-forward neural network or the like, by the artificial intelligence server.

On the other hand, according to another embodiment of the present invention, there is provided a low-power wire rope safety diagnosis system comprising: a sensor unit that wakes up from a standby mode and transmits a control request signal to an AP, detects motion through a motion detection sensor when a motion detection signal is received from the AP, performs wire rope safety diagnosis sensing through a safety diagnostic sensor when a motion is detected, stores sensor data generated by performing the safety diagnosis sensing in a database, and transmits the stored sensor data and a control request signal to the AP when the safety diagnosis sensing is terminated; a wire rope safety diagnosis platform including the AP, which is an access point that determines whether motion detection is needed when the control request signal is received from the sensor unit, and transmits a motion detection signal to the sensor unit when it is determined that the motion detection is needed, and requesting an artificial intelligence server to perform defect determination of a wire rope when the sensor data is received from the sensor unit; and the artificial intelligence server for determining a defect of the wire rope by performing signal processing on the sensor data through deep learning in response to the request of the platform.

The sensor unit includes a motion detection sensor for detecting movement of the wire rope and switching from the standby mode to an active mode, a safety diagnosis sensor for measuring defects of the wire rope, and the sensor unit includes a plurality of sensor nodes.

The AP receiving the control request signal determines whether sensing has been performed today, whether today corresponds to an operating date and an operating day, and whether a current time is business hours, and transmits a motion detection signal to the sensor unit only when it is determined that motion detection is needed.

The AP receiving the control request signal determines whether sensing has been performed today, whether today corresponds to an operating date and an operating day, and whether a current time is business hours, and transmits a standby signal to the sensor unit only when it is not determined that motion detection is needed, and the sensor unit enters the standby mode for a preset time.

The motion detection sensor is one of a plurality of sensor nodes included in the safety diagnosis sensor, which measures magnetic force of an object, compares a voltage measured before a predetermined time with a currently measured voltage, and determines that a motion is detected when a voltage difference exceeds a threshold voltage value.

The motion detection sensor is a gyro sensor connected to be separate from the safety diagnosis sensor to detect vertical movement, which compares a coordinate value of an object measured before a predetermined time with a currently measured coordinate value, and determines that a motion is detected when a z-axis change exceeds a threshold change.

The artificial intelligence server performs, when the platform requests the artificial intelligence server to perform signal processing on the sensor data received by the AP, a first determination step of performing preprocessing of removing noise and trend of the sensor data, and determining that there is a defect when leakage magnetic flux exceeding a predetermined value occurs, by the artificial intelligence server, and performs a second determination step of extracting various statistical features from the preprocessed data, and determining that there is a defect through deep learning of a feed-forward neural network or the like, by the artificial intelligence server.

DESCRIPTION OF SYMBOLS

Figure 1:
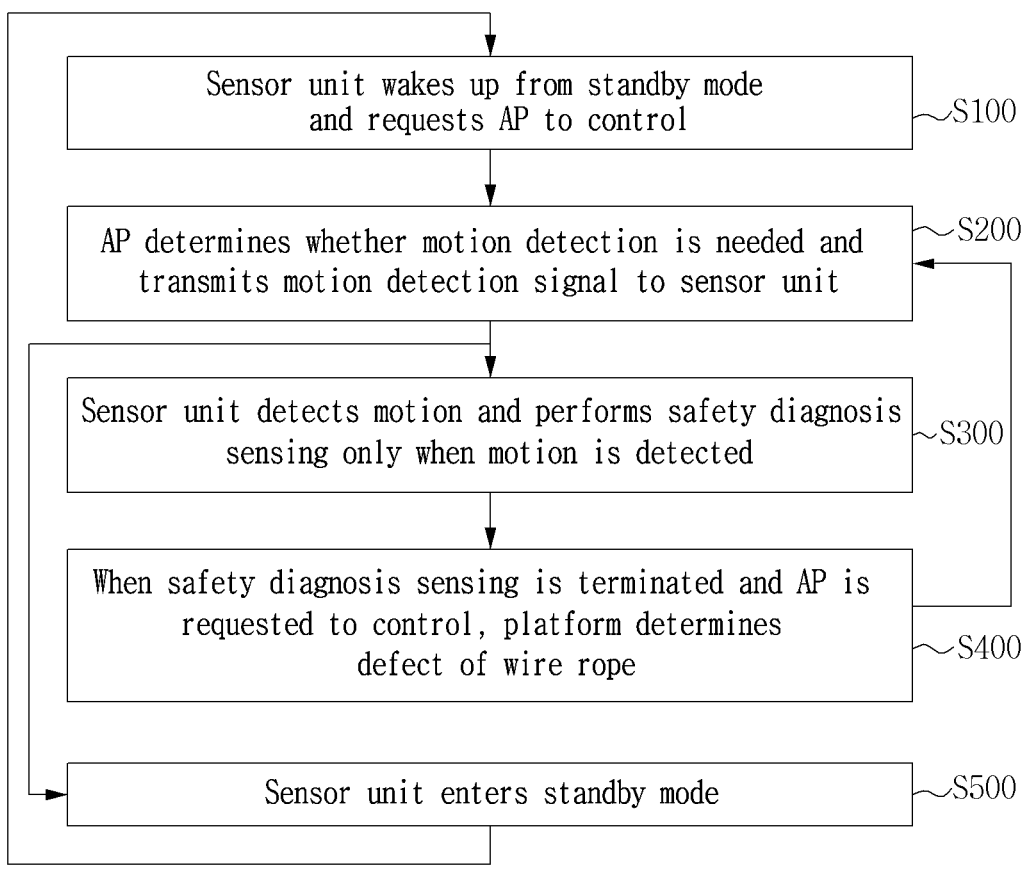
FIG. 1 is a flowchart illustrating a low-power wire rope safety diagnosis method according to an embodiment of the present invention.

10: Wire rope
100: Sensor unit
200: Platform
210: AP
300: Artificial intelligence server
400: Gateway
500: Database

DETAILED DESCRIPTION OF THE PREFERRED EMBODIMENT

The above objects, other objects, features, and advantages of the present invention will be easily understood through the following preferred embodiments related to the accompanying drawings. However, the present invention is not limited to the embodiments described herein and may be specified in other forms. Rather, the embodiments introduced herein are provided to make the disclosed contents thorough and complete and to sufficiently convey the spirit of the present invention to those skilled in the art.

In the present specification, when terms such as first and second are used to describe components, these components should not be limited by these terms. These terms are used only to distinguish one component from another component. The embodiments described and exemplified herein also include complementary embodiments thereof.

In addition, when a certain element, component, device, or system is mentioned to include a component made of a program or software, although they are not mentioned explicitly, it should be understood that the element, component, device, or system includes hardware (e.g., memory, CPU, etc.), other programs or software (e.g., a driver required to drive an operating system or hardware) needed to execute or operate the program or software.

In addition, terms used in the present specification are for describing embodiments and are not intended to limit the present invention. In this specification, singular forms also include plural forms unless specially stated in the phrase. The terms such as "comprises" and/or "comprising" used in this specification do not exclude the presence or addition of one or more other elements.

In addition, terms such as '~unit', '~group', 'module' and the like mean a unit for processing at least one function or operation and may be implemented by hardware, software, or a combination of hardware and software. In addition, articles such as 'a', 'an', 'the' and like may be used as a meaning including both the singular and the plural in the context describing the present invention, unless otherwise indicated in the specification or clearly contradicted by the context.

In describing the specific embodiments below, various specific contents have been written to more specifically describe the present invention and to aid understanding.

However, readers who have knowledge in this field enough to understand the present invention may recognize that the present invention can be used without these various specific contents.

In some cases, it is mentioned in advance that parts commonly known in describing the invention and not significantly related to the present invention are not described to avoid confusion that comes without any special reason in describing the present invention.

Hereinafter, specific technical contents to be embodied in the present invention will be described in detail with reference to the accompanying drawings.

FIG. 1 is a flowchart illustrating a low-power wire rope safety diagnosis method according to an embodiment of the present invention.

The present invention is an invention for saving power and improving efficiency by performing safety diagnosis only when a motion is detected in an active state while the wire rope safety diagnostic sensor is in a standby mode.

Referring to FIG. 1, a low-power wire rope safety diagnosis method according to an embodiment of the present invention includes the steps of waking up from a standby mode, and requesting an AP to control, by a sensor unit (S100), determining whether motion detection is needed, and transmitting a motion detection signal to the sensor unit, by the AP (S200), sensing a motion, and performing safety diagnosis sensing only when a motion is detected, by the sensor unit (S300), determining a wire rope defect through an artificial intelligence server, by a platform, when the safety diagnosis sensing is terminated and the AP is requested to control (S400), and entering the standby mode, by the sensor unit (S500).

Here, the step of waking up from a standby mode and requesting an AP to control by the sensor unit (S100) may be expressed as step (a).

At step (a), the sensor unit wakes up from the standby mode, activates a wireless transmission and reception unit (RF), and transmits a control request signal to the AP.

Hereinafter, the sensor unit may connect to and communicate with a gateway through the RF.

Here, the AP means an access point of a platform, which is software for diagnosing low-power wire rope safety.

Here, the standby mode may be expressed as SLEEP, and the standby mode means a mode in which a plurality of sensor nodes of the sensor unit that consume much power does not sense, and minimal power is consumed by turning off the RF of the sensor unit to check only time.

Here, when the sensor unit enters the standby mode, a duration of time for sustaining the standby mode is set in advance, and when the preset time is elapsed after the sensor unit enters the standby mode, the sensor unit wakes up from the standby mode.

Here, as the duration of time for sustaining the standby mode, a standby time may be diversely determined based on the time of using the wire rope, and the AP may variably apply the standby time.

Therefore, only time is checked in the standby mode.

Here, during the time other than the standby mode, it may be expressed as an active mode.

When the standby mode is switched to the active mode, the turned-off RF is turned on, and the sensor node and the RF are activated.

Here, the control request signal is transmitted to the AP through the gateway.

Here, the step of determining whether motion detection is needed and transmitting a motion detection signal to the sensor unit by the AP (S200) may be expressed as step (b).

At step (b), the AP receiving the control request signal from the sensor unit determines whether motion detection is needed and transmits a motion detection signal to the sensor unit when it is determined that motion detection is needed.

Here, when the AP determines that motion detection is needed, any one command among a motion detection signal (Detect), a standby mode entrance signal (Sleep), and an immediate safety diagnosis sensing signal (Active) may be transmitted to the sensor unit through the gateway according to a condition set in advance by the operator.

Here, the sensor unit may classify the received command, and detect motion when the command is the motion detection signal (Detect) (S300), immediately enter the standby mode when the command is the standby mode entrance signal (Sleep), and immediately begin a wire rope safety diagnosis without motion detection when the command is the immediate safety diagnosis sensing signal (Active).

Here, the condition for determining whether motion detection is needed by the AP may be set as a case of satisfying one or more conditions, and the conditions may be set diversely. In an embodiment, when the safety diagnosis sensing is performed only once a day and, in addition, when non-operating dates when safety diagnosis sensing is not performed, operating days, and operating hours are set in advance, it is determined whether sensing has been performed today, whether today corresponds to an operating date other than the non-operating dates, whether today corresponds to an operating day, or whether the current time is business hours, and the AP transmits the motion detection signal (Detect) to the sensor unit through the gateway only when it is determined that motion detection is needed.

Here, when it is determined that motion detection is not needed as a result of examining the conditions for determining whether motion detection is needed, the AP transmits the standby mode entrance signal (Sleep) to the sensor unit through the gateway.

In this case, the sensor unit enters the standby mode for a preset time period.

Here, when an immediate safety diagnosis sensing condition set in advance by the user is satisfied, the AP transmits an immediate safety diagnosis sensing (Active) entrance signal to the sensor unit through the gateway.

In this case, the sensor unit begins safety diagnosis sensing on a wire rope for a predetermined time period.

Here, the step of sensing motion and performing safety diagnosis sensing by the sensor unit only when a motion is detected (S300) may be expressed as step (c).

At step (c), when the sensor unit receives a motion detection signal (dect) from the AP through the gateway, the sensor unit begins to detect motion through the motion detection sensor, and when a motion is detected, the safety diagnosis sensor begins safety diagnosis sensing of a wire rope.

Here, the motion detection sensor is a sensor included in the sensor unit, which is one of a plurality of sensor nodes included in the safety diagnosis sensor, and it measures magnetic force of an object, compares a voltage measured before a predetermined time with a currently measured voltage, and determines that a motion is detected when the voltage difference exceeds a threshold voltage value.

Here, when the magnetic force is measured and magnetic flux changes, the voltage difference may be derived as the voltage changes accordingly.

In addition, the threshold voltage value may be set in advance by the operator.

Figure 2:
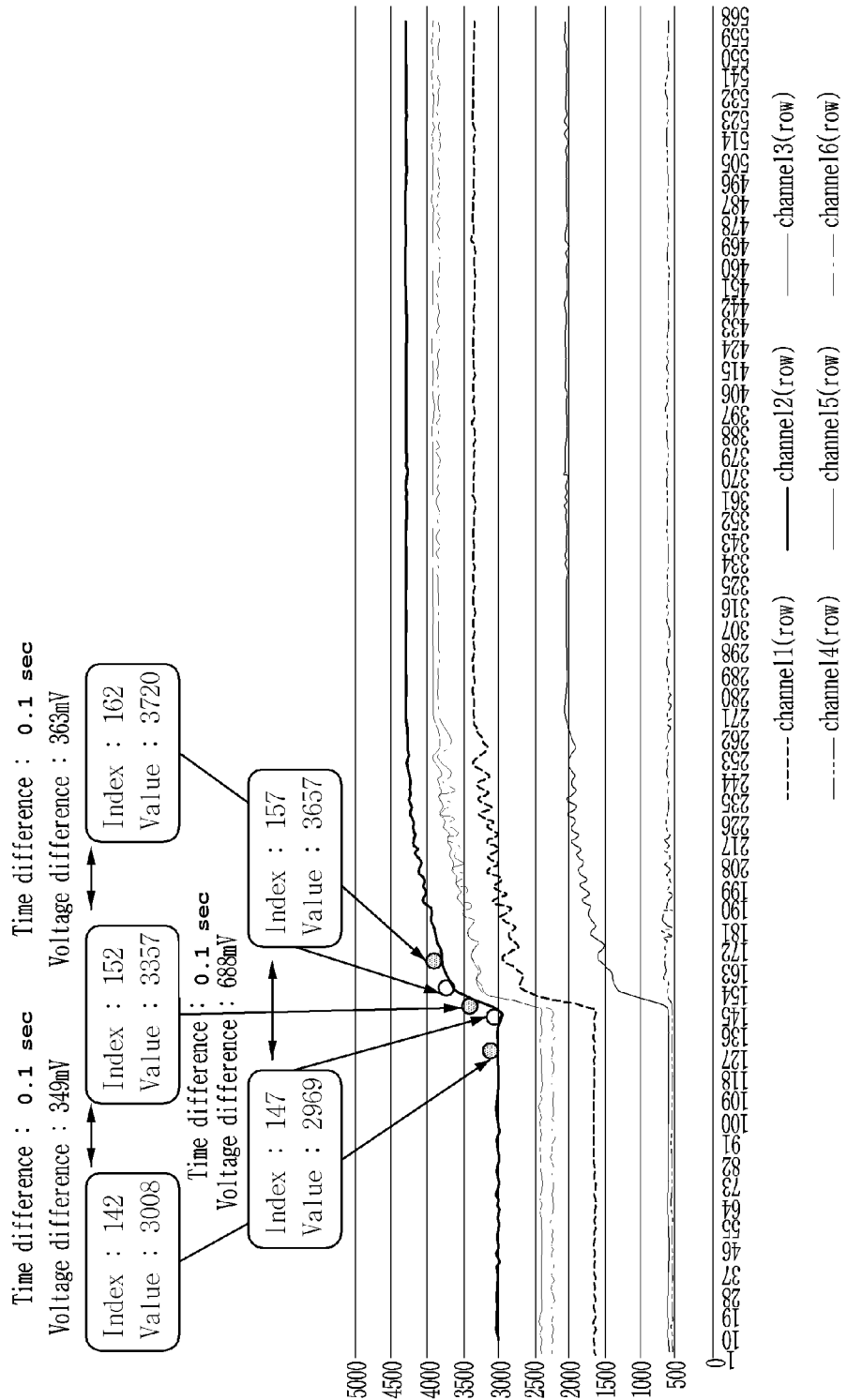
FIG. 2 is an exemplary view showing voltage measurement values of a motion detection sensor in a low-power wire rope safety diagnosis method and a system thereof according to an embodiment of the present invention.

FIG. 2 is an exemplary view showing voltage measurement values of a motion detection sensor in a low-power wire rope safety diagnosis method and a system thereof according to an embodiment of the present invention.

Referring to FIG. 2, voltage values derived through measurement values from a plurality of sensor nodes (six in the graph) of the sensor unit are shown as a graph, and among them, channel 2 may be used as a motion detection sensor.

Referring to FIG. 2, each node maintains a comparatively constant value in the beginning, and then voltages of some nodes rise in a specific time zone and are maintained at a high value.

Referring to FIG. 2, when voltages are sequentially measured at the node of channel 2 at the seconds of 1.42, 1.47, 1.52, 1.57, and 1.62, respectively, it appears that 3008 mV at 1.42 seconds, 2969 mV at 1.47 seconds, 3357 mV at 1.52 seconds, 3657 mV at 1.57 seconds, and 3720 mV at 1.62 seconds.

Accordingly, in this case, a currently measured voltage is compared with a voltage measured before a predetermined time. For example, in the case where the predetermined time is 0.1 seconds, when the current time corresponds to 1.52 seconds, the voltage difference between the currently measured voltage (3357 mV) and the voltage (3008 mV) measured 0.1 seconds ago (1.42 seconds) is 349 mV, when the current time corresponds to 1.57 seconds, the voltage difference between the currently measured voltage (3657 mV) and the voltage (2969 mV) measured 0.1 seconds ago (1.47 seconds) is 699 mV, and when the current time corresponds to 1.62 seconds, the voltage difference between the currently measured voltage (3720 mV) and the voltage (3357 mV) measured 0.1 seconds ago (1.52 seconds) is 363 mV.

Accordingly, only the voltage difference derived at 1.52 seconds exceeds the threshold voltage value when the threshold voltage value preset by the operator is 0.5V (500 mV), and therefore, in this case, it is determined that a motion is detected at 1.52 seconds.

In addition, referring to FIG. 1, at step (c) (S300), the motion detection sensor is a sensor included in the sensor unit, which is not one of the sensor nodes included in the safety diagnosis sensor, but a gyro sensor connected to be separate from the safety diagnosis sensor to detect vertical movement, and it may compare the coordinate value of an object measured before a predetermined time and a currently measured coordinate value, and determine that a motion is detected when the z-axis change exceeds a threshold change.

Here, when the moving range of a wire rope, which is an object, in the vertical direction exceeds the threshold change preset by the operator, it is determined that a motion is detected.

As unnecessary safety diagnosis is reduced by detecting movement through one of sensor nodes of the safety diagnosis sensor or a separate gyro sensor without immediately performing safety diagnosis of a wire rope as described above, and performing safety diagnosis only when a movement is detected, power can be used efficiently.

Only when a motion is detected as described above, wire rope safety diagnosis sensing begins through the safety diagnosis sensor.

Referring to FIG. 1, here, the step of determining a wire rope defect through an artificial intelligence server by a platform when the safety diagnosis sensing is terminated and the AP is requested to control (S400) may be expressed as step (d).

At step (d), the sensor unit stores the sensor data generated by performing the safety diagnosis sensing in a database, terminates the safety diagnosis sensing after a predetermined time is elapsed, and transmits the stored data and a control request signal to the AP. When the platform receiving the sensor data from the AP requests the artificial intelligence server to perform signal processing and defect determination on the sensor data, the artificial intelligence server determines a defect of the wire rope through deep learning.

Here, step (d) may include the steps of storing the sensor data generated by performing the safety diagnosis sensing in a database, terminating the safety diagnosis sensing after a predetermined time is elapsed, and transmitting the stored sensor data and a control request signal to the AP, by the safety diagnosis sensor of the sensor unit (S410), performing, when the platform requests the artificial intelligence server to perform signal processing on the sensor data received by the AP, a first determination step of performing preprocessing of removing noise and trend of the sensor data, and determining that there is a defect when leakage magnetic flux exceeding a predetermined value occurs, by the artificial intelligence server (S420), and performing a second determination step of extracting various statistical features from the preprocessed data, and determining that there is a defect through deep learning of a feed-forward neural network or the like, by the artificial intelligence server (S430).

Here, at the step of transmitting the stored sensor data and a control request signal to the AP (S410), the safety diagnosis sensor stores the sensor data in the database, and transmits the stored sensor data to the AP through the gateway.

Figure 3:
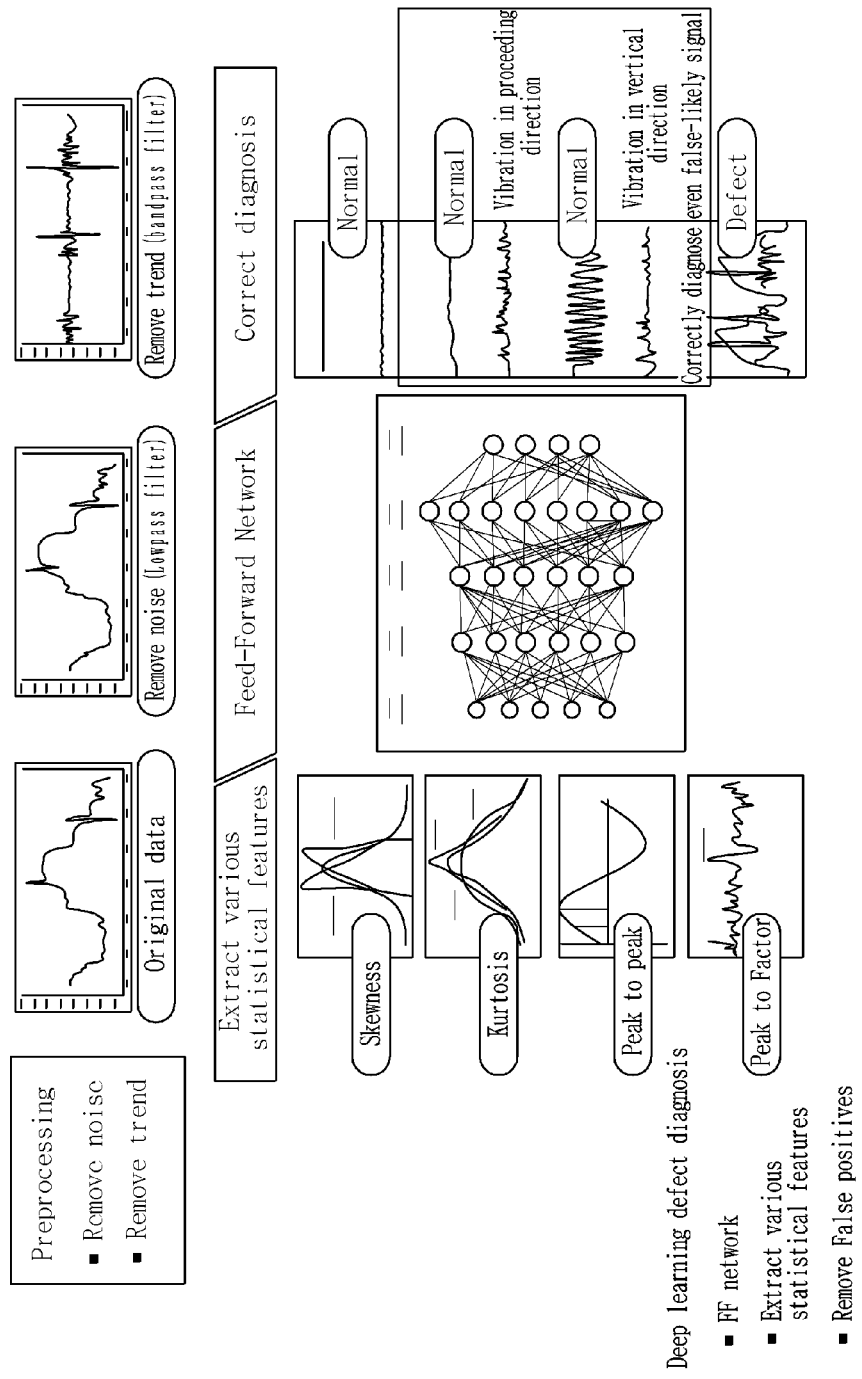
FIG. 3 is an exemplary view showing a defect diagnosis method of a low-power wire rope safety diagnosis method and a system thereof according to an embodiment of the present invention.

As described above, the sensor data transmitted to the platform through the AP is used to determine a defect of the wire rope through the artificial intelligence server, and the method of diagnosing a defect through deep learning by the artificial intelligence server is as shown in FIG. 3.

FIG. 3 is an exemplary view showing a defect diagnosis method of a low-power wire rope safety diagnosis method and a system thereof according to an embodiment of the present invention.

Here, at the first determination step (S420), the artificial intelligence server preprocesses the data, such as removing noise through a low-pass filter (LPF) and removing trends through a band-pass filter (BPF) from the original data.

Here, when leakage magnetic flux exceeding a predetermined reference value occurs from the preprocessed data, it is primarily determined that there is a defect.

In addition, at the second determination step (S430), the artificial intelligence server extracts various statistical features such as skewness, kurtosis, peak-to-peak, peak-to-factor and the like from the preprocessed data, correctly diagnoses a signal, which could be a false alarm, using a feed-forward network (FF network), and removes the false alarm and determines that there is a defect.

Referring to FIG. 1, the AP receiving the control request signal from the sensor unit through the gateway at step (d) repeats steps (b), (c) and (d) to determine whether it needs to perform the motion detection again.

In this case, the AP may transmit a standby mode entrance signal (SLEEP) if a sensing has been performed today as described above, and in this case, the sensor unit enters the standby mode (SLEEP) (S500).

The sensor unit entering the standby mode (SLEEP) wakes up after a predetermined time is elapsed and transmits a control request signal to the AP again (S100), and in the present invention, the standby mode and the active mode awakening from the standby mode are repeated alternately.

Figure 4:
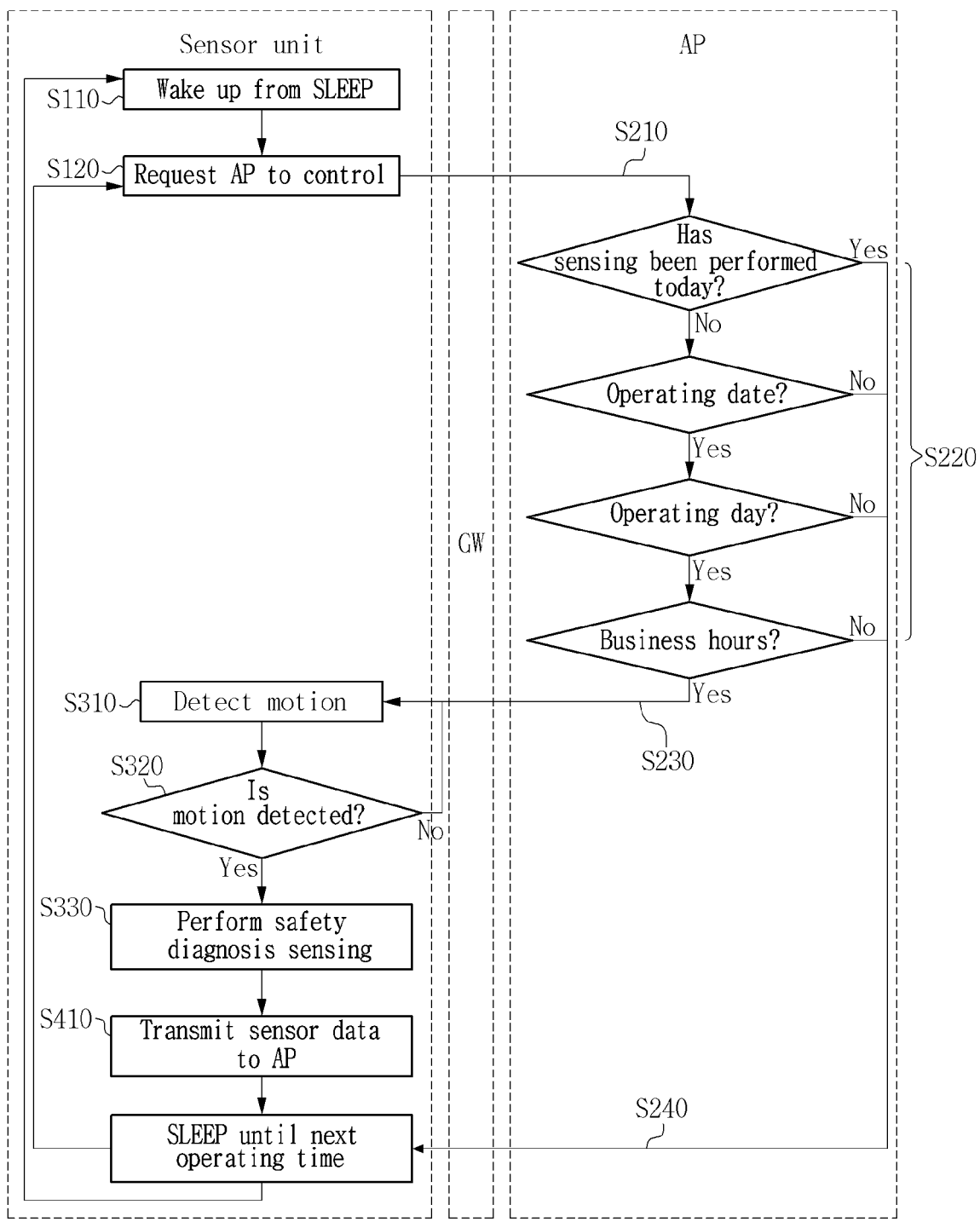
FIG. 4 is a flowchart illustrating in detail a motion detection technique of a low-power wire rope safety diagnosis method and a system thereof according to an embodiment of the present invention.

FIG. 4 is a flowchart illustrating in detail a motion detection technique of a low-power wire rope safety diagnosis method and a system thereof according to an embodiment of the present invention.

Referring to FIG. 4, an operation performed between the sensor unit and the AP for low-power operation of the wire rope safety diagnosis system may be shown.

First, at the step of waking up from a standby mode and requesting the AP to control by the sensor unit (S100), the sensor unit wakes up from the SLEEP (S110) and requests the AP to control through the gateway (S120).

Thereafter, at the step of determining whether motion detection is needed and transmitting a motion detection signal to the sensor unit by the AP (S200), when the AP receives a control request signal of the sensor unit through the gateway (S210), it determines whether motion detection is needed (S220). For example, it is determined whether sensing has been performed today, whether today is an operating date, whether today is an operating day, and whether the current time is business hours, and when sensing has not been performed today, today is an operating date other than non-operating dates, today is an operating day, and the current time is business hours, the AP transmits a motion detection signal the sensor unit through the gateway (S230).

However, when it corresponds to any one among the cases where sensing has been performed today, today is a non-operating date, today is not an operating day, and the current time is not business hours as a result of the determination, the AP transmits a signal directing to enter the SLEEP mode, i.e., the standby mode, until next operating time to sensor unit through the gateway (S240).

As the SLEEP signal includes a duration of time for sustaining the standby mode, when the time is elapsed, the sensor unit may wake up from the SLEEP (S110) and perform the steps from the beginning.

Thereafter, at the step of sensing motion and beginning safety diagnosis sensing only when a motion is detected by the sensor unit (S300), the sensor unit receiving the motion detection signal from the AP through the gateway begins motion detection (S310).

In this case, a motion is detected through the motion detection sensor as described above, and the motion detection sensor may detect movement by deriving a voltage difference using one of a plurality of sensor nodes of the safety diagnosis sensor, or may detect movement by deriving a change in position using a gyro sensor connected to be separate from the safety diagnosis sensor.

When a motion is detected (S320) after the motion detection has begun (S310), safety diagnosis sensing begins through the safety diagnosis sensor of the sensor unit (S330). This is to save power consumed by the sensor unit by performing safety diagnosis only when there is a movement.

However, when a motion is not detected (S320) after the motion detection has begun (S310), the motion detection is continued (S310).

Here, the sensor unit continues motion detection when a motion is not detected, and since the sensor unit may request control by sending a hash message to the AP at every predetermined time, the motion detection may be terminated when the AP separately requests another operation.

Thereafter, at the step of determining a wire rope defect by the platform when the safety diagnosis sensing is terminated and the AP is requested to control (S400), the sensor unit stores the sensor data generated by performing the safety diagnosis sensing in the database, and transmits the sensor data and a control request signal to the AP through the gateway when the safety diagnosis sensing is terminated (S410).

Here, the AP may receive the control request signal (S210), determine whether motion detection is needed again (S220), and transmit any one command among a motion detection signal (Detect), a standby mode entrance signal (Sleep), and an immediate safety diagnosis sensing signal (Active) to the sensor unit through the gateway (S230 and S240, active signal is not shown).

Here, the sensor unit receiving the standby mode entrance signal (SLEEP) maintains the standby mode until next operating time, and then wakes up from SLEEP after a predetermined time is elapsed (S110), and may repeat the process from the first step of FIG. 4.

Although not shown in FIG. 4, when the sensor unit transmits the sensor data to the AP (S410), the platform receiving the sensor data through the AP determines a defect of the wire rope through the artificial intelligence server as described above, and the method of diagnosing a defect through deep learning by the artificial intelligence server is as shown in FIG. 3.

Figure 5:
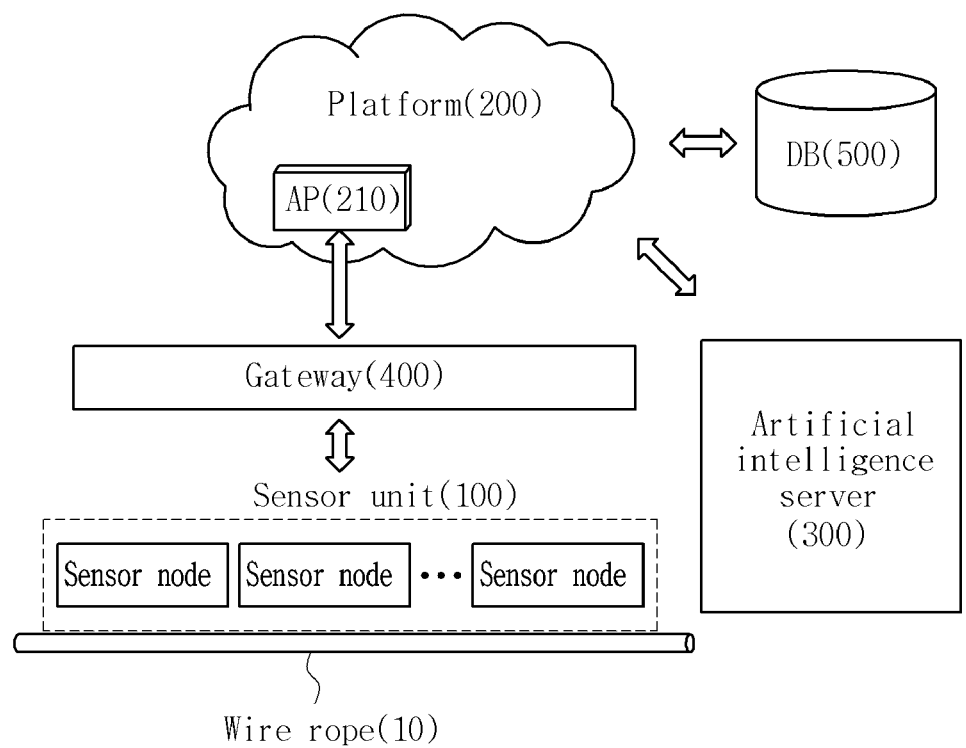
FIG. 5 is a block diagram showing the configuration of a low-power wire rope safety diagnosis system according to an embodiment of the present invention.

FIG. 5 is a block diagram showing the configuration of a low-power wire rope safety diagnosis system according to an embodiment of the present invention.

Referring to FIG. 5, a low-power wire rope safety diagnosis system according to an embodiment of the present invention includes a sensor unit 100 including a plurality of sensor nodes attached to the wire rope 10 to perform a measurement for motion and safety diagnosis, a platform 200 for managing the entire system, and an artificial intelligence server 300, and the like.

Here, the sensor unit 100 wakes up from the standby mode and activates the RF, transmits a control request signal to the AP 210, detects motion through the motion detection sensor when a motion detection signal (detect) is received from the AP 210, performs wire rope safety diagnosis sensing through the safety diagnosis sensor when a motion is detected, stores sensor data generated by performing the safety diagnosis sensing in a database, terminates the safety diagnosis sensing after a predetermined time is elapsed, and transmits the stored data and a control request signal to the AP 210.

Here, the AP 210 means an access point of a platform, which is software for diagnosing low-power wire rope safety.

Accordingly, the sensor unit 100 performs a function of performing safety diagnosis sensing of the wire rope 10, detecting movement of the wire rope 10, entering SLEEP (standby mode) that prevents power consumption, and transmitting data to the gateway 400.

Here, each sensor node of the sensor unit 100 may be paired by transmitting a contact request (contact req) to the gateway 400 when the power is turned on and receiving a contact response (contact res).

Here, the standby mode may be expressed as SLEEP, and the standby mode means a mode in which a plurality of sensor nodes of the sensor unit that consume much power does not sense, and minimal power is consumed by turning off the RF of the sensor unit to check only the time.

Here, when the sensor unit enters the standby mode, a duration of time for sustaining the standby mode is set in advance, and when a preset time is elapsed after the sensor unit enters the standby mode, the sensor unit wakes up from the standby mode.

Here, as the duration of time for sustaining the standby mode, a standby time may be diversely determined based on the time of using the wire rope, and the AP may variably apply the standby time.

Therefore, only time is checked in the standby mode.

Here, during the time other than the standby mode, it may be expressed as an active mode.

When the standby mode is switched to the active mode, the turned-off RF is turned on, and the sensor node and the RF are activated.

The sensor unit 100 includes a motion detection sensor for detecting movement of a wire rope and switching from the standby mode to the active mode, a safety diagnosis sensor for measuring defects of the wire rope, and a plurality of sensor nodes, an RF, and the like for sensing a wire rope through the sensors and transmitting a signal including sensor data generated as a result of the sensing to the gateway.

Here, the platform 200 is software for diagnosing wire rope safety with low power and is also referred to as platform software.

Here, the platform 200 includes an AP 210 for determining whether motion detection is needed when a control request signal is received from the sensor unit 100 and transmitting a motion detection signal to the sensor unit 100 when it is determined that motion detection is needed, and the platform 200 requests the artificial intelligence server 300 to perform defect determination of a wire rope.

Here, when the AP 210 receives the control request signal from the sensor unit 100 through the gateway 400, it determines whether motion detection is needed, and transmits a motion detection signal to the sensor unit 100 when it is determined that motion detection is needed.

Here, when the AP 210 determines that motion detection is needed, any one command among a motion detection signal (Detect), a standby mode entrance signal (Sleep), and an immediate safety diagnosis sensing signal (Active) may be transmitted to the sensor unit 100 through the gateway 400 according to a condition set in advance by the operator.

Here, the sensor unit 100 may classify the received command and begin motion detection when the command is the motion detection signal (Detect), immediately enter the standby mode when the command is the standby mode entrance signal (Sleep), and immediately begin a wire rope safety diagnosis without motion detection when the command is the immediate safety diagnosis sensing signal (Active).

Here, the condition for determining whether motion detection is needed by the AP 210 may be set as a case of satisfying one or more conditions, and description thereof is as described above.

Here, the platform 200 controls the sensor unit 100 to collect, store or process sensor data through the gateway 400, manages defects of the wire rope, expresses wire rope defect management status on a dashboard or the like, and transmits a defect state to users.

Here, when the sensor unit 100 receives a motion detection signal from the AP 210 through the gateway 400, the sensor unit begins to detect motion through the motion detection sensor, and when a motion is detected, the safety diagnosis sensor begins safety diagnosis sensing of the wire rope 10.

Here, the motion detection sensor is a sensor included in the sensor unit 100, which is one of a plurality of sensor nodes included in the safety diagnosis sensor, and it measures magnetic force of an object, compares a voltage measured before a predetermined time and a currently measured voltage, and determines that a motion is detected when the voltage difference exceeds a threshold voltage value.

Here, when magnetic force is measured and the magnetic flux changes, the voltage difference can be derived as the voltage changes accordingly.

In addition, the threshold voltage value may be set in advance by the operator.

Description thereof made through an example is as described above.

In addition, the motion detection sensor is a sensor included in the sensor unit 100, which is not one of the sensor nodes included in the safety diagnosis sensor, but a gyro sensor connected to be separate from the safety diagnosis sensor to detect vertical movement, and it may compare the coordinate value of an object measured before a predetermined time with a currently measured coordinate value, and determine that a motion is detected when the z-axis change exceeds a threshold change.

Here, when the moving range of a wire rope 10, which is an object, in the vertical direction exceeds the threshold change preset by the operator, it is determined that a motion is detected.

As unnecessary safety diagnosis is reduced by detecting movement through one of sensor nodes of the safety diagnosis sensor or a separate gyro sensor without immediately performing safety diagnosis of a wire rope as described above, and performing safety diagnosis only when a movement is detected, power can be used efficiently.

The sensor unit 100 stores the sensor data generated by performing the safety diagnosis sensing in a database 500, terminates the safety diagnosis sensing after a predetermined time is elapsed, and transmits the stored data and a control request signal to the AP 210 through the gateway 400.

Here, when the sensor unit 100 terminates the safety diagnosis sensing and requests the AP 210 to control, the platform 200 requests the artificial intelligence server 300 to perform signal processing and defect determination on the sensor data, and the artificial intelligence server 300 may determine a defect of the wire rope 10 through deep learning.

Referring to FIG. 5, the artificial intelligence server 300 determines a defect of the wire rope by performing signal processing on the sensor data through deep learning in response to the request of the platform 200.

Here, the artificial intelligence server 300 performs a first determination of performing preprocessing of removing noise and trend of the sensor data, and determining that there is a defect when leakage magnetic flux exceeding a predetermined value occurs, and a second determination of extracting various statistical features from the preprocessed data, and determining that there is a defect through deep learning of a feed-forward neural network or the like.

Description thereof is as described above.

Accordingly, the artificial intelligence server 300 performs a function of signal-processing the sensor data and determining a defect of the sensor data.

In addition, since the low-power wire rope safety diagnosis system according to an embodiment of the present invention can be driven in the same manner as the low-power wire rope safety diagnosis method as described above, duplicated descriptions will be omitted.

Referring to FIG. 5, a low-power wire rope safety diagnosis system according to an embodiment of the present invention may include a gateway 400 for transmitting signals between the sensor unit 100 and the AP 210 of the platform 200, a database 500 for storing the sensor data, and the like.

Here, the gateway 400 performs a function of transmitting signals between the sensor unit 100 and the platform 200, such as collecting sensor data from the sensor unit 100 and transmitting the sensor data to the platform 200, and transmitting a command of the platform 200 to the sensor unit 100.

Here, the database 500 stores sensor data or the like generated by the sensor unit 100 through safety diagnosis sensing of the wire rope 10.

As described above, according to the preferred embodiments of the present invention, it is possible to improve efficiency in diagnosing safety of a wire rope by saving power in a way of switching a sensor to a standby mode during other than a predetermined period of time, and sensing motion only when needed to perform a safety diagnosis only when a movement is detected, and as deep learning is used in the safety diagnosis, a more consistent and correct defect diagnosis can be made.

The effects of the present invention are not limited to those mentioned above, and unmentioned other effects will be clearly understood by those skilled in the art from the following description.

As described above, the embodiment of the present invention is not implemented only through the device and/or operation method described above, but may be implemented through a program for realizing a function corresponding to the configuration of the embodiment of the present invention, a recording medium on which the program is recorded, and the like by those skilled in the art from the description of the embodiment described above. Although the embodiment of the present invention has been described above in detail, the scope of the present invention is not limited thereto, and various modifications and improvements made by those skilled in the art using the basic concept of the present invention defined in the following claims also belong to the scope of the present invention.

What is claimed is:

1. A low-power wire rope safety diagnosis method comprising the steps of:
    (a) waking up from a standby mode and transmitting a control request signal to an access point (AP), which is an access point of a software platform for diagnosing low-power wire rope safety, by a sensor unit;
    (b) determining whether motion detection is needed, and transmitting a motion detection signal to the sensor unit when it is determined that motion detection is needed, by the AP receiving the control request signal from the sensor unit;
    (c) detecting motion through a motion detection sensor, and performing wire rope safety diagnosis sensing through a safety diagnosis sensor when a motion is detected, by the sensor unit receiving the motion detection signal from the AP;
    (d) determining a defect of a wire rope using deep learning through an artificial intelligence server when the sensor unit terminates the safety diagnosis sensing, by the platform; and
    (e) repeating steps (b) to (d).

2. The method according to claim 1, wherein at step (a), the sensor unit wakes up from the standby mode when a preset time is elapsed after the sensor unit enters the standby mode.

3. The method according to claim 1, wherein at step (b), the AP determines whether sensing has been performed today, whether today corresponds to an operating date and an operating day, and whether a current time is business hours, and transmits a motion detection signal to the sensor unit only when it is determined that motion detection is needed.

4. The method according to claim 1, wherein at step (b), the AP determines whether sensing has been performed today, whether today corresponds to an operating date and an operating day, and whether a current time is business hours, and transmits a standby signal to the sensor unit only when it is not determined that motion detection is needed, and the sensor unit enters the standby mode for a preset time.

5. The method according to claim 1, wherein at step (c), the motion detection sensor is one of a plurality of sensor nodes included in the safety diagnosis sensor, which measures magnetic force of an object, compares a voltage measured before a predetermined time with a currently measured voltage, and determines that a motion is detected when a voltage difference exceeds a threshold voltage value.

6. The method according to claim 1, wherein at step (c), the motion detection sensor is a gyro sensor connected to be separate from the safety diagnosis sensor to detect vertical movement, which compares a coordinate value of an object measured before a predetermined time with a currently measured coordinate value, and determines that a motion is detected when a z-axis change exceeds a threshold change.

7. The method according to claim 1, wherein at step (d), the sensor unit stores sensor data generated by performing the safety diagnosis sensing in a database, and transmits the stored sensor data and the control request signal to the AP when the safety diagnosis sensing is terminated, and when the platform receiving the sensor data from the AP requests the artificial intelligence server to perform signal processing and defect determination on the sensor data, the artificial intelligence server determines a defect of the wire rope through deep learning.

8. The method according to claim 7, wherein step (d) includes the steps of:
    storing the sensor data generated by performing the safety diagnosis sensing in the database, terminating the safety diagnosis sensing after a predetermined time is elapsed, and transmitting the stored sensor data and the control request signal to the AP, by the sensor unit;
    performing, when the platform requests the artificial intelligence server to perform signal processing on the sensor data, a first determination step of performing preprocessing of removing noise and trend of the sensor data, and determining that there is a defect when leakage magnetic flux exceeding a predetermined value occurs, by the artificial intelligence server; and
    performing a second determination step of extracting various statistical features from the preprocessed data, and determining that there is a defect through deep learning of a feed-forward neural network or the like, by the artificial intelligence server.

9. A low-power wire rope safety diagnosis system comprising:
    a sensor unit that wakes up from a standby mode and transmits a control request signal to an access point (AP), detects motion through a motion detection sensor when a motion detection signal is received from the AP, performs wire rope safety diagnosis sensing through a safety diagnostic sensor when a motion is detected, stores sensor data generated by performing the safety diagnosis sensing in a database, and transmits the stored sensor data and a control request signal to the AP when the safety diagnosis sensing is terminated;
    a wire rope safety diagnosis platform including the AP, which is an access point that determines whether motion detection is needed when the control request signal is received from the sensor unit, and transmits a motion detection signal to the sensor unit when it is determined that the motion detection is needed, and requesting an artificial intelligence server to perform defect determination of a wire rope when the sensor data is received from the sensor unit; and the artificial intelligence server for determining a defect of the wire rope by performing signal processing on the sensor data through deep learning in response to the request of the platform.

10. The system according to claim 9, wherein the sensor unit includes a motion detection sensor for detecting movement of the wire rope and switching from the standby mode to an active mode, a safety diagnosis sensor for measuring defects of the wire rope, and the sensor unit includes a plurality of sensor nodes.

11. The system according to claim 9, wherein the AP receiving the control request signal determines whether sensing has been performed today, whether today corresponds to an operating date and an operating day, and whether a current time is business hours, and transmits a motion detection signal to the sensor unit only when it is determined that motion detection is needed.

12. The system according to claim 9, wherein the AP receiving the control request signal determines whether sensing has been performed today, whether today corresponds to an operating date and an operating day, and whether a current time is business hours, and transmits a standby signal to the sensor unit only when it is not determined that motion detection is needed, and the sensor unit enters the standby mode for a preset time.

13. The system according to claim 9, wherein the motion detection sensor is one of a plurality of sensor nodes included in the safety diagnosis sensor, which measures magnetic force of an object, compares a voltage measured before a predetermined time with a currently measured voltage, and determines that a motion is detected when a voltage difference exceeds a threshold voltage value.

14. The system according to claim 9, wherein the motion detection sensor is a gyro sensor connected to be separate from the safety diagnosis sensor to detect vertical movement, which compares a coordinate value of an object measured before a predetermined time with a currently measured coordinate value, and determines that a motion is detected when a z-axis change exceeds a threshold change.

15. The system according to claim 9, wherein the artificial intelligence server performs, when the platform requests the artificial intelligence server to perform signal processing on the sensor data received by the AP, a first determination step of performing preprocessing of removing noise and trend of the sensor data, and determining that there is a defect when leakage magnetic flux exceeding a predetermined value occurs, by the artificial intelligence server, and performs a second determination step of extracting various statistical features from the preprocessed data, and determining that there is a defect through deep learning of a feed-forward neural network or the like, by the artificial intelligence server.

* * * * *